United States Patent [19]

Larson et al.

[11] Patent Number: 4,532,564
[45] Date of Patent: Jul. 30, 1985

[54] REMOVABLE DISK CARTRIDGE

[75] Inventors: Bert R. Larson, San Jose; Robert P. Wartenbergh, Woodside; Janusz Warszawski, Los Altos; Markus Meier, Carpinteria; David A. Sutton, Santa Ynez; Bin-Lun Ho, Los Gatos; Efim Bronshvatch, Saratoga, all of Calif.

[73] Assignee: Dysan Corporation, Santa Clara, Calif.

[21] Appl. No.: 302,864

[22] Filed: Sep. 16, 1981

[51] Int. Cl.³ .......................... G11B 5/02; G11B 23/02
[52] U.S. Cl. ........................................ 360/97; 360/133
[58] Field of Search ................................ 360/97–99, 360/133, 135; 206/444

[56] References Cited

U.S. PATENT DOCUMENTS

| 4,078,246 | 3/1978 | Berthoux et al. | 360/133 |
| 4,092,687 | 5/1978 | Butsch | 360/97 X |
| 4,106,066 | 8/1978 | Kudo | 360/133 |
| 4,106,067 | 8/1978 | Masuyama | 360/137 |
| 4,149,207 | 4/1979 | Porter et al. | 360/99 X |
| 4,185,313 | 1/1980 | Green et al. | 360/133 |
| 4,194,228 | 3/1980 | Duff | 360/133 |
| 4,310,864 | 1/1982 | Patel et al. | 360/97 |
| 4,369,475 | 1/1983 | Ho et al. | 360/97 |
| 4,376,293 | 3/1983 | Teramura et al. | 360/99 X |
| 4,391,543 | 7/1983 | Elsing | 360/97 |
| 4,394,700 | 7/1983 | Edwards | 360/133 |

Primary Examiner—John H. Wolff
Attorney, Agent, or Firm—Townsend and Townsend

[57] ABSTRACT

A removable hard disc memory cartridge for use with a drive mechanism including a spindle located within a drive housing.

The drive housing interior is provided with stationary position registration members which cooperate with mating side edge portions of the cartridge to provide positive positioning when the cartridge is inserted into the drive housing. A disc lock carried by the cartridge maintains the internally mounted cartridge disc in a secured locked position when the cartridge is not in use, the lock mechanism cooperating with release posts carried by the drive housing to free the disc for rotation just prior to engagement by the drive spindle. The disc has a self centering hub including a spindle referencing member having an aperture for receiving the free end of the spindle, the referencing member including angularly spaced arcuate segments closely matched to the radius of curvature of the drive spindle and providing a lateral abutment for the outer surface of the surface, the referencing member further including a spindle biasing spring laterally spaced from the arcuate segments and engageable with the outer surface of the spindle for urging the spindle into surface contact with the arcuate segments. The housing includes an end wall with an air exit port laterally displaced from the transducer access port, which provides a circumferentially oriented flow exit path for air entering the volume enclosed by the cartridge via the access port when the disc is rotated.

19 Claims, 13 Drawing Figures

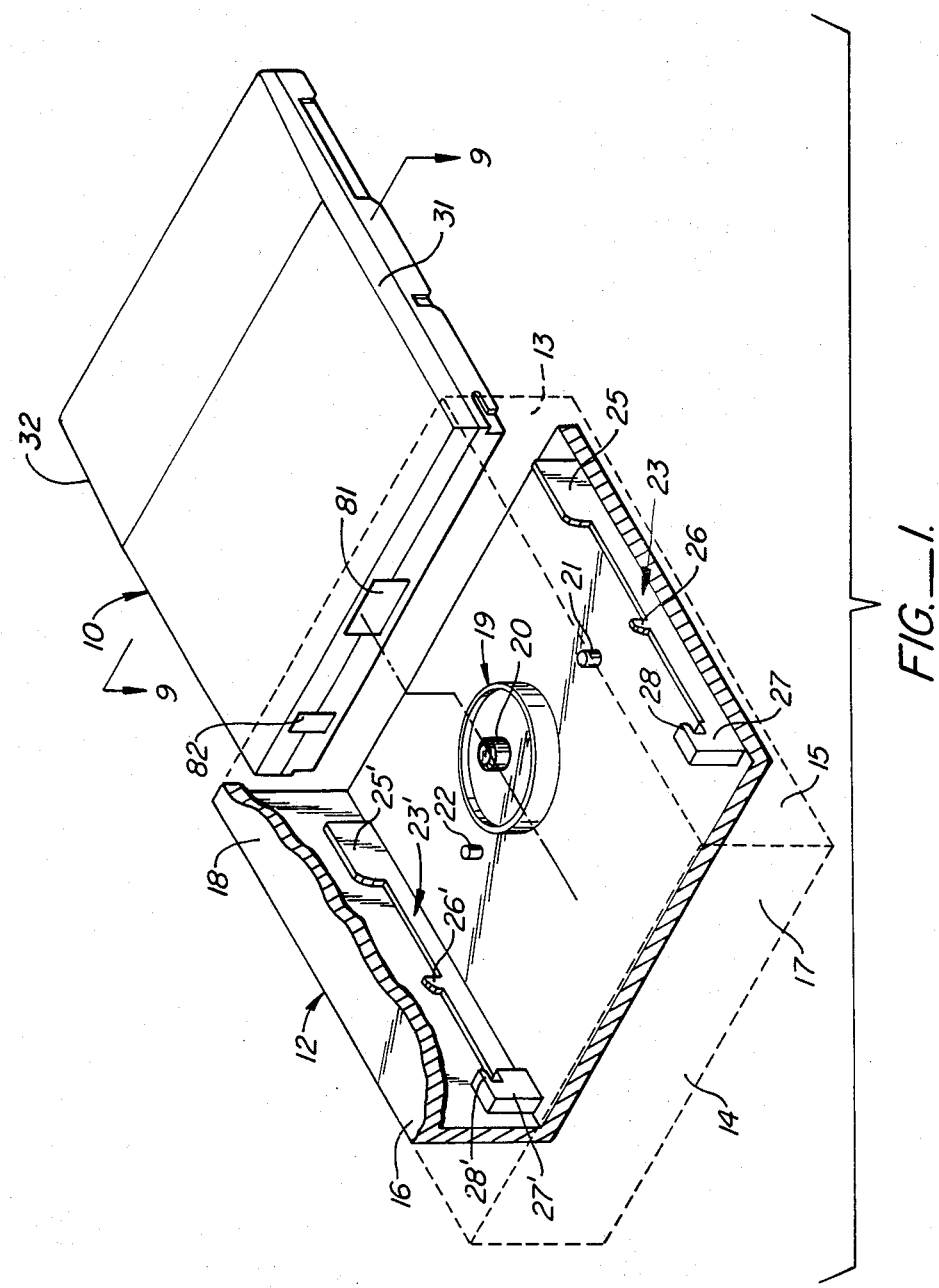

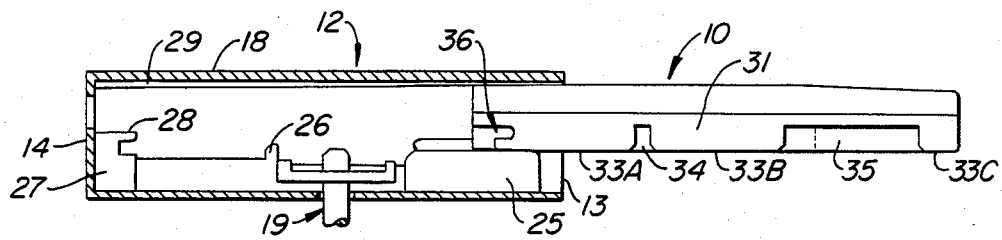
FIG._2A.
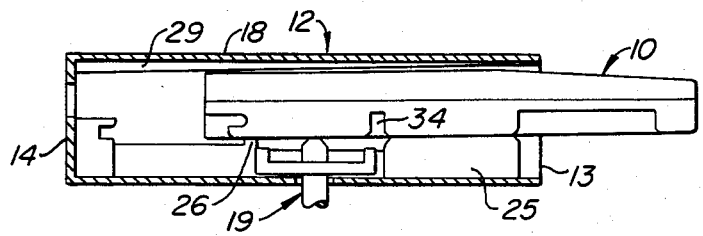
FIG._2B.
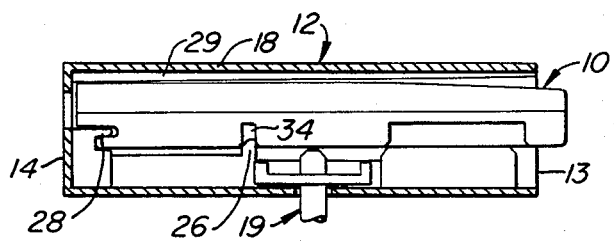
FIG._2C.
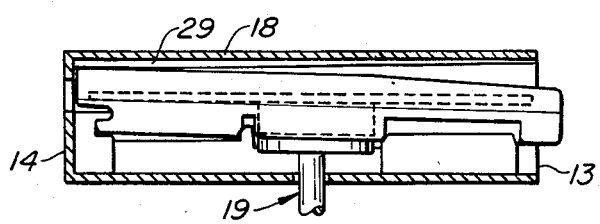
FIG._2D.

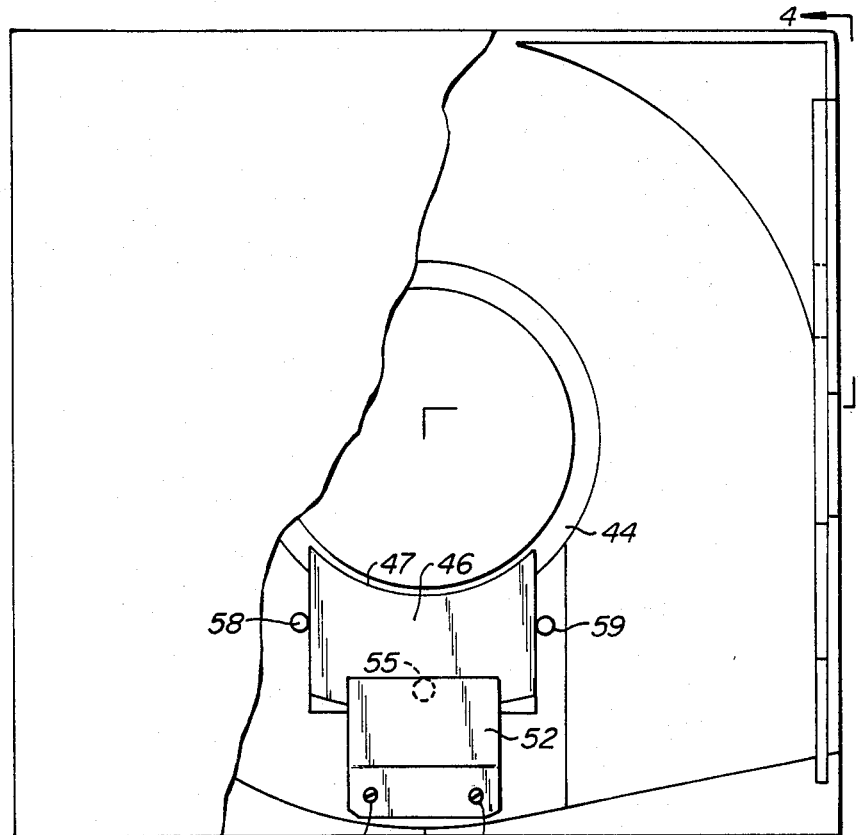
FIG._3.
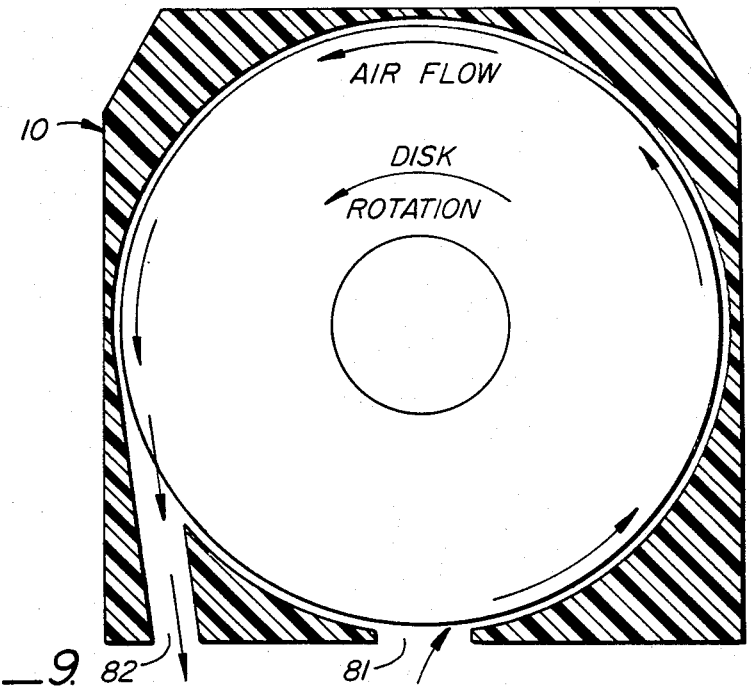
FIG._9.

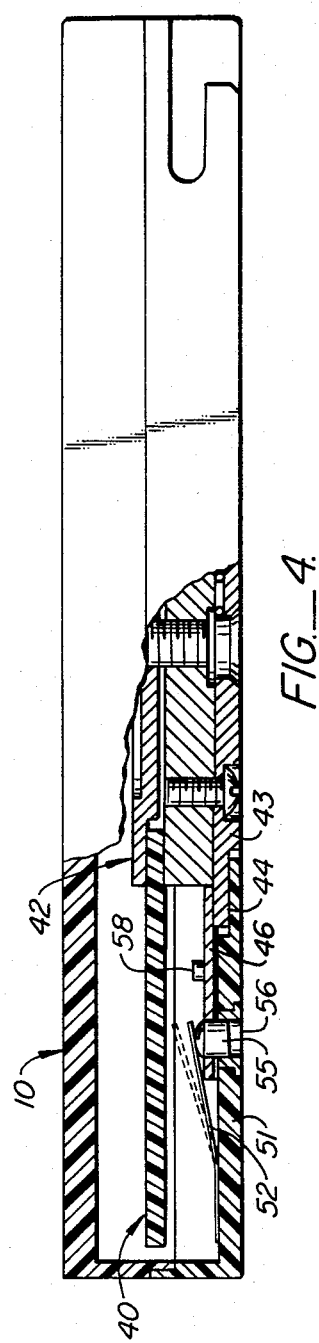
FIG._4.
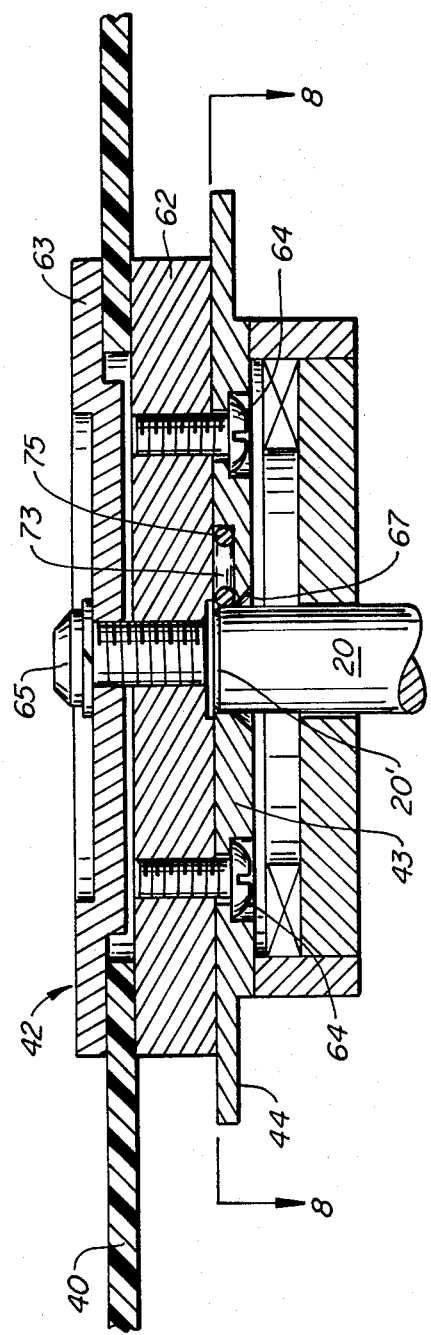
FIG._7.

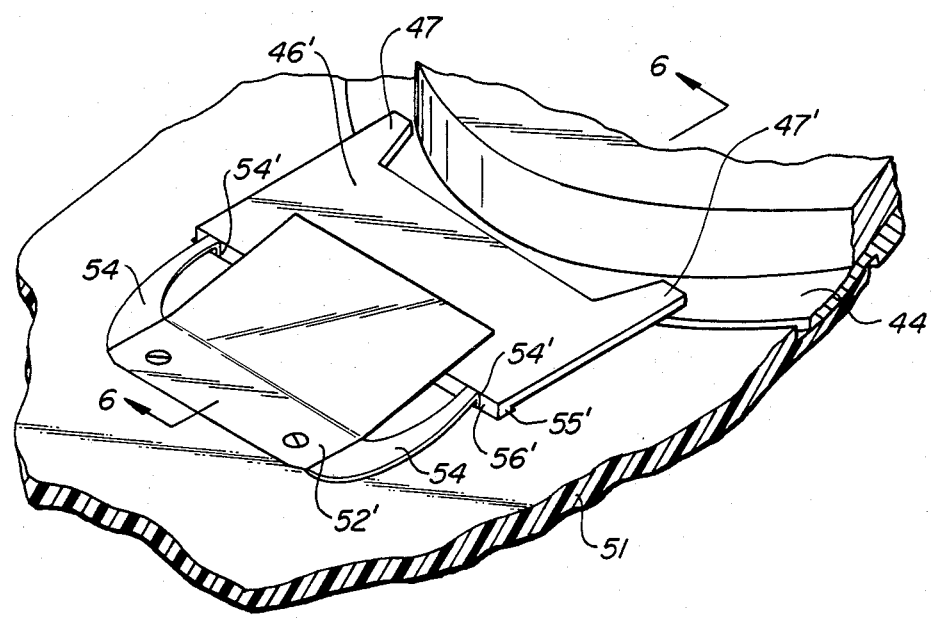
FIG._5.
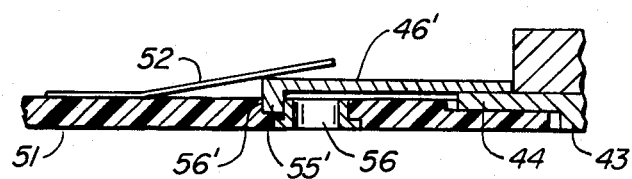
FIG._6.

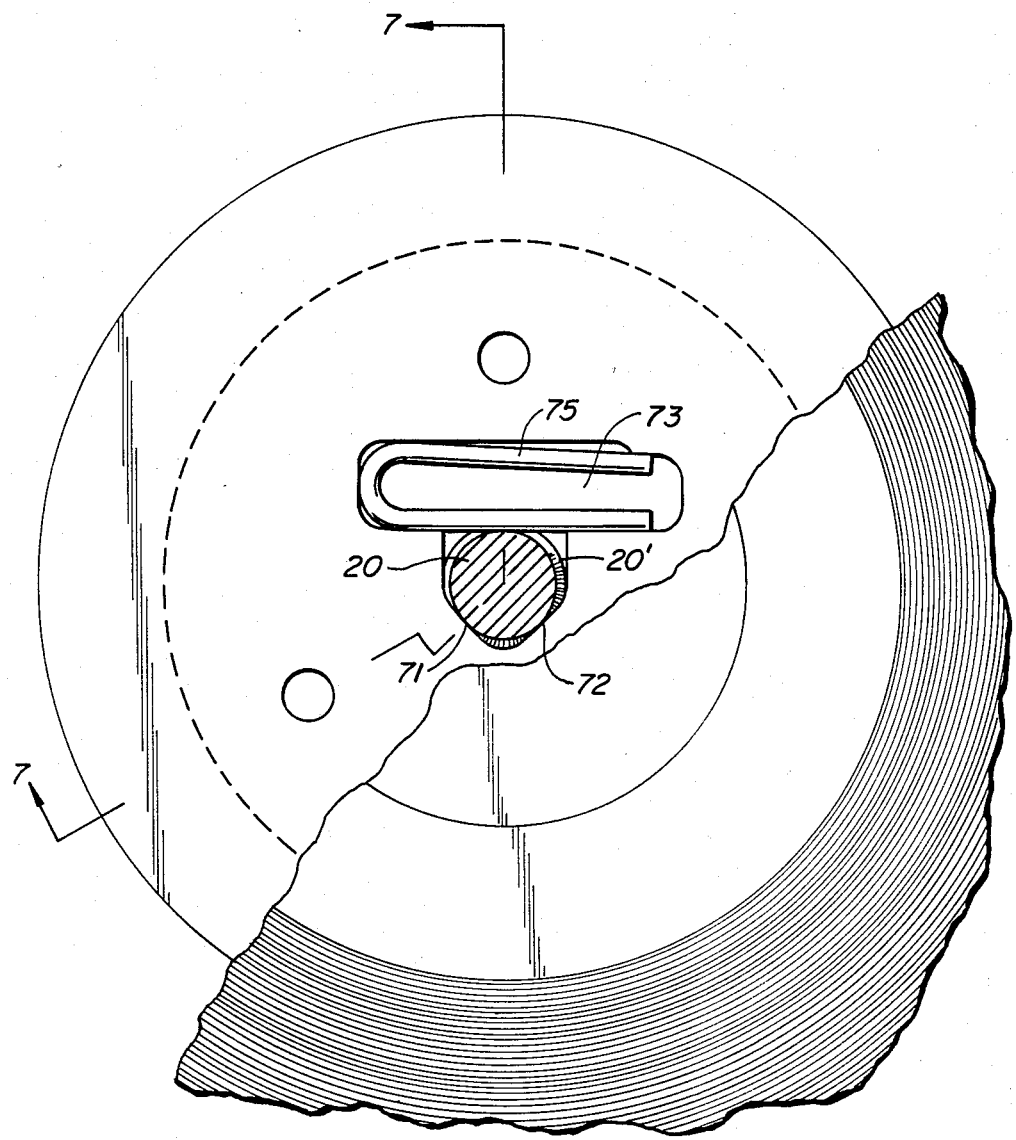
FIG._8.

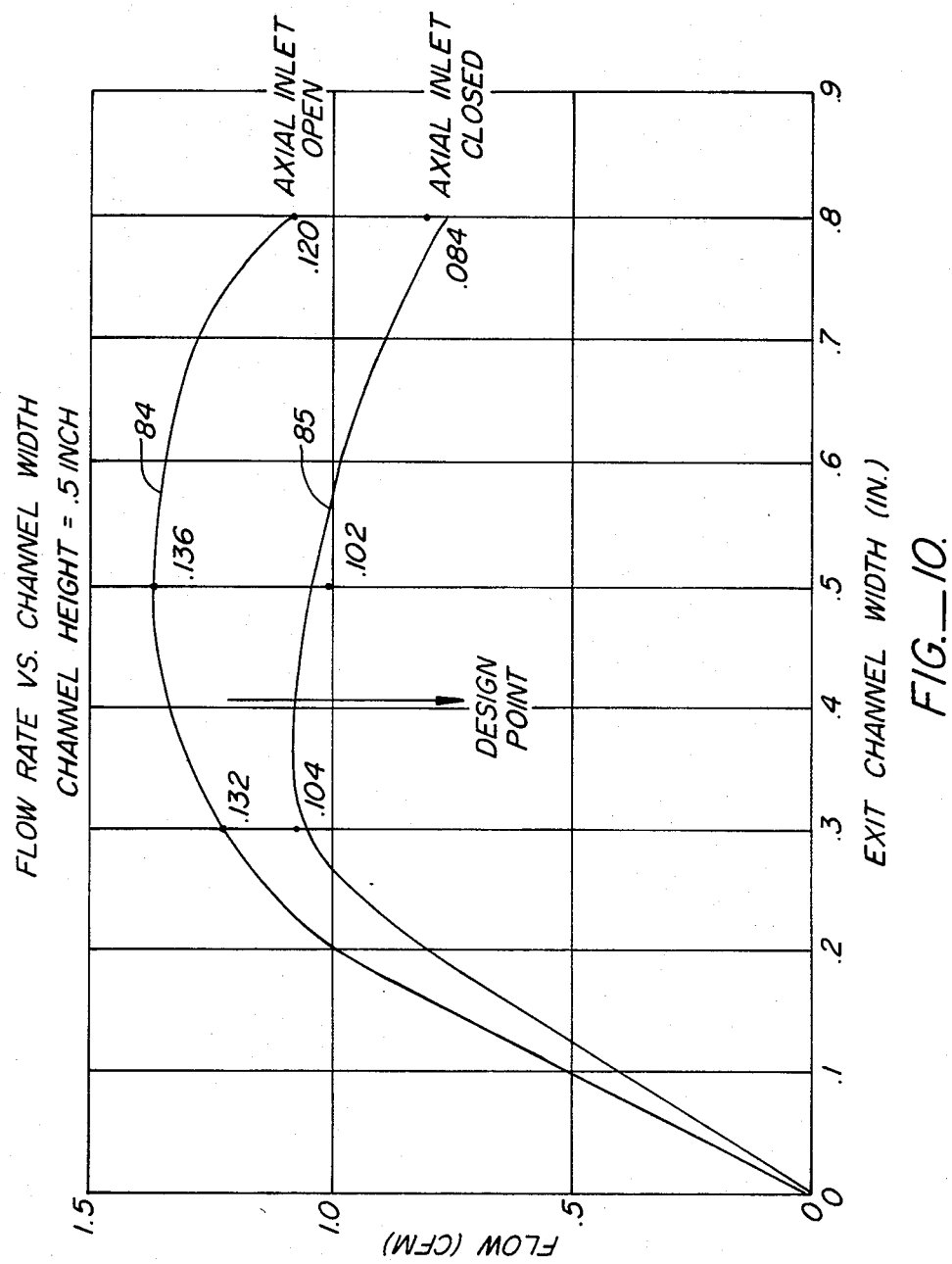

REMOVABLE DISK CARTRIDGE

This invention relates to disk memory cartridges in general, and specifically to medium to small size disk memory cartridges adapted to be removably attached to an associated disk drive mechanism having a drive spindle.

Many current generation hard disk drives used in the data processing industry are designed to be removably attached to an associated disk drive unit. The removable disk cartridge typically includes a housing, a hard or rigid disk mounted within the housing, and an externally accessible hub connected to the disk for enabling the disk to be rotated by an externally located drive spindle. While early removable hard disk media devices were rather large and bulky, recent trends in major segments of the industry have dictated disk cartridges of an increasingly smaller size. Concurrently, the trend has been toward improving the track density of the disks so that more tracks per inch may be reliably recorded and reproduced on the disk recording surfaces. In addition, major design efforts have recently revolved around providing read/write transducers having smaller magnetic gaps, and providing transducer mounting and translating mechanisms for more precisely positioning the transducers closely adjacent the disk recording surfaces in order to increase the track density. The twin requirements of decreased physical size for the cartridge and disk and increased track density have given rise to several problems which are addressed by this invention.

Firstly, the increasingly miniaturization of removable disk media has created the need for positioning mechanisms for enabling the cartridge to be precisely positioned with respect to the associated disk drive prior to engagement of the drive spindle with the disk hub (magnetic coupling mechanisms being typically employed for the rotational drive). Although many such positioning mechanisms have been proposed, such devices typically require precisely machined mechanical parts which must be individually assembled and which can be prone to premature mechanical wear. Moreover, existing centering mechanisms designed for use with large size disk cartridges cannot be practically scaled down to small size cartridges of the type to which this invention pertains. In addition, because of the close track tolerances and the small physical dimensions of the cartridge housing, disk locking mechanisms are required which are relatively tamper-free so that the disk is retained within the cartridge housing when not in use in an attitude in which the delicate disk recording surfaces do not come into contact with the internal portions of the cartridge, in order to preserve the integrity of the disk recording layer. Further, after the cartridge has been positioned within the associated disk drive housing, the drive spindle must be accurately aligned with the disk hub in such a manner that the disk is accurately centered on the drive spindle. In addition, when the disk is being attached to or released from the drive spindle, care must be taken to prevent tipping of the disk within the cartridge housing, again to preserve the integrity of the disk recording layer. Lastly, since the removable disk cartridge must be provided with a transducer access port to enable the entry and exit of the externally located transducer read/write heads, provision must be made to reduce the amount of particulate contaminants entering into and remaining within the confines of the cartridge housing, since such contaminants can accumulate on the read/write transducer surfaces and destroy the delicate recording layer of the disk. While older generation removable hard disk cartridges, such as the single or multiple platter disk packs, are provided with forced air feed accessories which provide positive flow filtered air for sweeping the particles out of the housing interior, the relatively small size and lower cost design of current generation removable disk cartridges renders the provision of such an accessory prohibitive in cost and space.

All of the above noted disadvantages are exacerbated by the fact that removable disk cartridges are increasingly handled and used by relatively unsophisticated operators in less than ideal environments. More specifically, while older generation removable hard disk media were typically used by relatively skilled computer operators in a tightly controlled environment, the current trend is away from these ideal conditions. In fact, the present trend is toward use of such media wherever medium to small size computers may be found, such as in retail stores, small business offices and even in the home. Accordingly, the need exists for a relatively inexpensive yet highly reliable small removable hard disk cartridge which avoids the disadvantages noted above.

SUMMARY OF THE INVENTION

The invention comprises a relatively small, removable hard disk cartridge which is inexpensive to maufacture, rugged in construction, relatively insensitive to moderately hostile environments, yet which is highly reliable in operation.

The disk cartridge of the invention includes a cartridge registration arrangement for enabling the cartridge to be readily positioned with reference to the associated disk drive spindle within a disk drive housing. The cartridge housing includes a pair of opposed side wall members each having registration means engageable with a mating stationary position registration member incorporated into each side wall of the drive housing. The stationary position registration members each extend along the inner edge of the associated drive housing side wall and include an entry ramp portion, a reference stop/pivot portion spaced along the wall from the entry ramp portion, and an intermediate guide portion. Each cartridge registration means includes an edge surface for contacting the entry ramp portion when the cartridge is initially inserted into the drive housing and for contacting the intermediate guide portion as the cartridge is advanced into the interior of the drive housing so that the cartridge housing is slidingly engaged with the position registration members. Each cartridge registration means further includes a pivot engagement located at a forward edge of the cartridge for pivoting engagement with the pivot portion of the registration member when the cartridge is located at a predetermined longitudinal position in the drive housing. The lower edge surface of each cartridge registration means includes first and second engagement guides for individually engaging the intermediate guide portion and the ramp portion of the registration member when the cartridge is pivoted about the pivot portion toward the registration member so that the cartridge is restrained against longitudinal movement when positioned in the proper operating attitude. The ramp portion and the intermediate guide portion preferably comprise male members extending in a direction generally normal to the longitudinal axis of the drive housing side wall, and the first and second engagement guides preferably are complementarily shaped recesses formed in the edge surface of the cartridge.

To facilitate cooperation between the registration members and the cartridge registration means, the drive housing is provided with cartridge biasing means extending along the inner side walls of the drive housing for urging the cartridge edge surfaces into contact with their respective registration members as the cartridge is advanced within the drive housing, the biasing means cooperating with the registration member to guide the pivot engagement means into contact with the pivot means. In the preferred embodiment, each cartridge biasing means comprises an abutment member extending longitudinally of the corresponding drive housing side wall at a predetermined angle with respect to the top edge. The cartridge registration means are preferably formed integrally with the cartridge side walls; while the drive housing registration members preferably comprise individual elements attached to the inner side walls of the drive housing.

The invention is also provided with an extremely simple disk locking means for automatically maintaining the disk in a secured position within the cartridge when not in use. The disk locking means includes a relatively rigid lock plate member having an inner margin normally engaged with the disk hub. A spring bias means is coupled to the lock means for normally urging the disk hub into the secured position, the spring biasing means normally contacting an outer margin of the lock plate member. A release mechanism enables the lock plate to be raised away from engagement with the disk hub when the cartridge is lowered onto the floor of the disk drive housing, the release means including a relatively stiff cylindrical pin secured to the lock plate adjacent the outer margin and slidably received in a snug confinement channel formed in the cartridge housing in a direction generally perpendicular to the lock plate. The pin and aperture are located in a position which registers with an upstanding release post secured to the bottom drive housing wall when the cartridge is fully inserted in the drive housing, so that the post is received in the cartridge aperture and forces the pin into the interior of the cartridge housing against the force of the bias spring when the cartridge is lowered onto the drive housing floor. In an alternate embodiment, the confinement channel comprises a slot formed in an inner wall surface of the cartridge housing below the disk hub, and the pin comprises one or more lugs extending from the lock plate into the slot. In this embodiment, the release means further includes an aperture in the cartridge housing which registers with the release post when the cartridge is fully inserted, so that the release post progressively engages the lock plate in the region of the confinement channel to translate the lug in a direction away from the bottom of the slot as the release post is advanced into the aperture. The lock plate is restrained against lateral motion by means of a pair of flanking posts extending upwardly from the bottom inner surface of the cartridge or, alternatively, by means of a pair of abutment arms extending from the spring biasing means.

In order to afford precise centering of the disk on the associated drive spindle, the disk hub is provided with a spindle referencing plate having an aperture for receiving the free end of the drive spindle, the referencing member including first and second angularly spaced arcuate segments each defining a peripheral portion of the aperture and providing a lateral abutment for the outer surface of the spindle in the region adjacent the free end. The radius of curvature of each of the arcuate segments is closely matched to the radius of curvature of the spindle in order to provide precisely aligned abutment surfaces. The reference member further includes a spindle biasing spring laterally spaced from the arcuate segments and engageable with the outer surface of the spindle in the region of the free end for urging the spindle into surface contact with the arcuate segments when the free end is received in the aperture. The bias spring preferably comprises a U-shaped spring member positioned in a slot formed in the surface of the referencing member facing the exterior of the cartridge, the slot having preselected dimensions to maintain the spring in a preloaded attitude, and a mating plate for retaining the spring in the slot. The referencing member further includes a tapered central wall portion which provides a generally conical entry ramp for the free end of the spindle, the inner end of the central wall portion terminating in the arcuate segments.

In order to reduce the accumulation of particulate contaminants within the volume enclosed by the cartridge housing, the invention includes a specially designed air flow system which promotes air flow through the cartridge using a self-pumping principle. In particular, a cartridge end wall having a centrally located transducer access port is provided with an air exit port which is laterally displaced from the transducer access port and which is angled to provide a circumferentially oriented flow exit path for air exiting from the cartridge. The transducer access port is used as a first air entrance port and a second air entrance port is afforded by a gap between the disk hub and the bottom wall of the cartridge when the hub has been unlocked during use. In operation, with the disk in motion within the cartridge housing, air is drawn into the enclosed volume via the relatively large transducer access port, flows past the transducers and circumferentially around the surface of the disk, and exits via the circumferentially oriented flow exit path through the air exit port. In addition, air is drawn into the cartridge housing via the second air entrance port to supplement the flow through the cartridge housing interior and out the air exit port. Preferably, the air exit port is dimensioned to provide maximum exiting air flow for a cartridge with given dimensions.

To further reduce the opportunity for particulate contaminants to foul the cartridge interior volume, as well as the interior volume of the drive housing, the cartridge housing is fabricated from an anti-static material to reduce static charge accumulation on the cartridge surfaces.

For a fuller understanding of the nature and advantages of the invention, reference should be had to the ensuing detailed description, taken in conjunction with the accompanying drawings.

BRIEF DESCRIPTION OF THE DRAWINGS

FIG. 1 is a schematic perspective view illustrating a preferred embodiment of the invention;

FIGS. 2A-D are schematic side views illustrating the cartridge insertion operation;

FIG. 3 is a top plan view partially broken away illustrating a detail of the disk locking mechanism;

FIG. 4 is a partial sectional view taken along lines 4—4 of FIG. 3;

FIG. 5 is a partial perspective view illustrating an alternate embodiment of the disk locking arrangement;

FIG. 6 is a partial sectional view taken along lines 6—6 of FIG. 5;

FIG. 7 is an enlarged sectional view taken along lines 7—7 of FIG. 8 showing certain details of the disk hub and the driving end of the associated drive spindle;

FIG. 8 is an end view taken along lines 8—8 of FIG. 7;

FIG. 9 is a schematic sectional view taken along lines 9—9 of FIG. 1 illustrating the air flow path of the disk cartridge; and FIG. 10 is a plot of air flow versus exit port width for the arrangement of FIG. 9.

DESCRIPTION OF THE PREFERRED EMBODIMENTS

Turning now to the drawings, FIG. 1 is a schematic sectional view illustrating the invention. As seen in this FIG., a hard disk cartridge 10 is arranged for removable positioning within an associated disk drive housing generally indicated by reference numeral 12 and illustrated as having transparent front, back and side walls 13-16, respectively. Drive housing 12 also has a bottom wall or floor 17 from which a drive member 19 extends in the upward direction. Drive member 19 is of conventional design and is provided with an associated driving mechanism (not shown) to permit rotation about the axis of a chamfered spindle 20. Extending upwardly from floor 17 of housing 12 are a pair of posts 21, 22 for a purpose to be described.

Mounted along the inner bottom surface of side walls 15, 16 are a pair of symmetrically shaped stationary position registration members generally designated with reference numerals 23, 23'. Registration member 23 comprises a generally longitudinally extending monolithic location guide having an entry ramp portion 25, an intermediate guide portion 26, and a stop portion 27 having a pivot portion 28. The stop portion 27 and the pivot portion 28 have a lateral thickness somewhat greater than the remaining portion of registration member 23 in the preferred embodiment. The corresponding portions of registration member 23' are designated with the same reference numerals using a prime symbol.

Cartridge 10 is provided with a pair of similar side wall members 31, 32 (only the former being clearly visible in FIG. 1) shaped to coact with the registration members 23, 23' to facilitate insertion and removal of the cartridge 10 to and from the drive housing 12. As best seen in FIG. 2A, side wall 31 of cartridge 10 includes a lower edge surface with portions 33a, 33b and 33c separated by recessed engagement guides 34, 35. Engagement guide 34 is dimensioned to slidably receive intermediate guide 26 of registration member 23; similarly, engagement guide 35 is dimensioned to slidably receive entry ramp portion 25. In addition, side wall 31 is provided with a pivot engagement portion 36 consisting of a notched slot as shown. The relative spacing between lower edge surfaces 33a-c, engagement guides 34, 35 and ramp portion 25, intermediate guide 26 and pivot portion 28 are selected in such a manner that the edge portions 33a-c are continuously supported by the upper edge of elements 25, 26 as the cartridge is advanced into the interior of the drive housing 12 (FIG. 2B).

To facilitate insertion of the cartridge 10 into the drive housing 12, a tapered abutment edge 29 extends from the front wall 13 to the rear or transducer location wall 14, the edge being located in the joint between each side wall 15, 16 and the upper wall 18. Alternatively, the inner surface of the upper wall 18 may be entirely formed with the taper. The angle of the taper is selected so that the cartridge is guided into the pivot engaging position illustrated in FIG. 2C in which the pivot portion 28 is received within the slot in the pivot engaging portion 36 of the cartridge 10. In this position, intermediate guide 26 is in registration with engagement guide 34, while ramp portion 25 is in registration with engagement guide 35. The cartridge is next lowered into an operating attitude onto the spindle by permitting the cartridge to pivot about the pivot portion 28. As described more fully below, just prior to engagement of the drive member 19 with the hub portion of the disk cartridge 10, the posts 21, 22 (FIG. 1) operate a releaseable disk locking mechanisms located within cartridge 10 to free the internally mounted disk for rotation. Removal of the cartridge 10 from the drive housing 10 is the reverse of the procedure just described.

FIGS. 3 and 4 illustrate one of the two internal disk locating mechanisms employed in the invention. As seen in these Figs., the annular disk 40 is mounted on a central hub portion generally designated by reference numeral 42 having an armature portion 43, preferably fabricated from a magnetically permeable material (for use with a magnetic chuck portion of drive member 19), the armature 43 having a peripheral circular flange 44. A locking plate 46 is provided with a suitably shaped inner margin such as the circular segmental inner margin 47 illustrated, in order to accommodate the circular periphery of hub portion 42, and locking plate 46 is maintained in engaging contact with the flange 44 by means of a biasing spring 52 secured to the bottom wall 51 of the cartridge housing by any suitable fastening means, such as screws 53. The normal position of bias spring 52 is illustrated in full in FIG. 4.

Secured to the portion of lock plate 46 adjacent the outer margin is a rigid pin 55 which is received within a reinforced aperture 56 in cartridge housing bottom wall 51. Pin 55 and aperture 56 are dimensioned to provide a snug fit so that any motion off the axis of pin 55 is kept to a minimum. Lock plate 46 and pin 55 form a rigid lever in the position illustrated in FIG. 4 which, in combination with spring 52, provides a stiff resisting force to upward motion of armature 43 and hub 42 when external pressure is applied to the bottom of the armature 43. More particularly, whenever armature 43 is urged upwardly away from cartridge bottom wall 51, rigid lock plate 46 is rotated a small angular distance until pin 55 binds in aperture 56. The magnitude of the permitted angular motion is extremely small (1° in an embodiment actually constructed). Thus, when the cartridge is not in use, or is being inserted or removed from the drive housing 12, the disk 40 is locked in place by a substantial force. A similar disk locking mechanism is located within the right-hand portion of the cartridge hidden from view in FIGS. 3 and 4.

After the cartridge has been inserted to the position illustrated schematically in FIG. 2C, however, and the cartridge is lowered toward the position shown in FIG. 2D, upstanding post 22 enters aperture 56 and translates pin 55 in the upward direction against the force of spring 52. As pin 55 is translated upwardly, lock plate 46 is carried with the pin, thereby releasing the armature 43, and thus the hub 42 and disk 40, for rotation. It should be noted that in order to prevent lateral motion of the lock plate 46, a pair of guide posts 58, 59 are secured to the bottom wall 51 of the cartridge housing in the embodiment of FIGS. 3 and 4.

When the cartridge is raised from the position illustrated in FIG. 2D, the post 22 is withdrawn from the aperture 56, and the pin 55 and lock plate 46 are forced downwardly by the action of spring 52 to lock the hub 42 and disk 40 in place. The operation of the other disk locking mechanism is identical to that described, with the exception that post 21 is used to release the mechanism.

FIGS. 5 and 6 illustrate an alternate embodiment of the lock plate mechanism, identical numerals being used for identical elements to those shown in the embodiment of FIGS. 4 and 5, and prime symbols being used to designate different structural elements having similar functions. As seen in these Figs., a modified lock plate 46' is provided with a pair of flanking inner arms 47' which contact hub flange 44, and a downwardly depending relatively stiff lug portion 55' which is received in a channel 56', the inner margins 47' maintaining contact with flange 44 of armature 43 in the locked configuration illustrated. Aperture 56 is provided which cooperates with post 22 to raise the lock plate 46' when the cartridge is inserted into the drive housing 12 and lowered from the position illustrated in FIG. 2C toward the fully loaded position illustrated in FIG. 2D. Spring 52' is provided with a pair of flanking arms 54 having downturned inner ends 54' which bear against the outer margin edge of spring 46' in order to prevent lateral motion of spring 46'.

The invention is provided with a relatively simple yet exceedingly effective spindle centering arrangement best illustrated in FIGS. 7 and 8. As seen in these Figs., hub 42 includes armature 43, central mounting portion 62 and top pressure plate 63, these elements being secured together by means of machine screws 64, 65. Armature 43 is provided with a central aperture having a tapered lead-in portion 67 for providing coarse centering for drive member spindle 20 and terminating in an upper central apertured portion best viewed in FIG. 8. As seen in this Fig., the upper central apertured portion includes a pair of arcuate segments 71, 72 angularly spaced about the axis of the aperture and having a radius of curvature closely matched to the radius of curvature of the spindle 20. Received within a recess 73 formed in the upper wall of armature plate 43 is a U-shaped biasing spring 75 which urges spindle 20 against arcuate segments 71, 72 when the free end of the spindle 20 is fully home in the position illustrated in FIG. 7. The walls of recess 73 are dimensioned to provide a predetermined preloading for spring 75, which is approximately two pounds in the preferred embodiment of the invention. Generally speaking, the preloaded spring force should be set at a value providing a sufficient spring force to overcome any magnetic lateral forces produced by magnet 76 in the driving member 19.

In use, as the free end of spindle 20 approaches armature plate 43, the tapered lead-in portion 67, in combination with the spindle end chamfer 20', serve to guide spindle 20 into the upper aperture. As the free end of spindle 20 reaches home, spring 75 makes contact with the side surface of spindle 20 thereby urging the generally opposite portion of the spindle surface into mating engagement with arcuate segments 71, 72. For best results, the armature 43 and the spindle 20 should be fabricated from materials having substantially equal coefficients of thermal expansion.

As noted above, the invention employs a self-pumping positive air flow system for minimizing the accumulation of particle contaminants within the cartridge 10. FIG. 9 illustrates a portion of the novel flow path provided according to the invention. As seen in this Fig., an air entry port is provided by the normal transducer access port 81 formed in the forward wall of the cartridge housing. The air exit port is provided by a port and channel 82 which is laterally spaced from the centrally located transducer access port 81 and which provides a circumferentially oriented flow path for air exiting from the internal volume of the disk cartridge. Because of the circumferential arrangement of the air exit port and channel 82, minimal flow resistance is encountered by air which enters into the internal volume of the cartridge, flows in the counterclockwise direction noted in FIG. 9, along the surface of the disk and exits via port and channel 82. A supplemental air flow inlet is afforded by the gap between armature plate 43 and the central aperture in bottom cartridge wall 51, whenever the disk is in the unlocked operating position. For optimum results, the air exit port/channel 82 is designed with optimal dimensions for a cartridge of a given size. FIG. 10 is a plot of air flow in cubic feet per minute versus exit channel 82 width in inches for an exit channel having a height of one-half inch. Two separate plots are shown in FIG. 8: a first curve 84 in which the axial inlet (afforded by the separation of armature plate 43 from the bottom wall 51 of the cartridge housing) is opened, and a second curve 85 in which this inlet is closed. As clearly shown by these two curves, an optimum point exists for which the flow rate of the air through the channel is at an approximate peak value, which is 0.4 inch for the particular cartridge on which the FIG. 10 measurements were based. It is understood that, for cartridges having different dimensions, a different optimal exit channel width will exist.

To further lessen the opportunity for contamination of the internal cartridge volume, as well as the internal volume of the drive housing, the cartridge housing is preferably fabricated from an anti-static material, or provided with an anti-static outer layer such as that disclosed in U.S. Pat. No. 4,106,067. By providing anti-static external surfaces for the cartridge housing, static charge build-up on the cartridge surfaces is substantially reduced, which reduces the number of aerosols attracted to the cartridge surfaces.

As will now be apparent, cartridges fabricated in accordance with the teachings of the invention afford several advantages over known removable hard disk cartridges. Firstly, the cartridge insertion and removal process is greatly simplified, without sacrificing precise positive engagement of the cartridge in the disk drive housing and without the need for any moving parts. It is important to note that, during motion of the cartridge 10 from the FIG. 2C to FIG. 2D position (and also during the reverse motion), the disk 40 pivots with the cartridge 10 as a unit until just prior to full engagement of the spindle 20 with the hub 42. This pivoting motion is provided in the region of the drive housing where the read/write transducers are normally located, and serves to prevent damaging mechanical contact between the transducers and the delicate disk recording surfaces during insertion and removal of the cartridge. Moreover, the cooperation between the cartridges positioning mechanism, the lock release posts 21, 22, and the hub unlocking mechanism ensures that the disk will not be released until just prior to engagement of the drive spindle 20 and magnetic chuck with the disk hub. Consequently, there is no danger of the disk tipping within the cartridge housing during the loading or unloading of a cartridge, which is a significant problem in some removable cartridges. This capability is further enhanced by the positive self-locking mechanism provided for the hub, which automatically affords a relatively strong retaining force against the armature plate flange to prevent accidental defeating of the lock mechanism. In addition, the spindle registration afforded by the positive acting spring 75 and arcuate segments 71, 72 ensures repeatability of disk centering on the spindle 20 to a very precise degree (40 microinches in an embodiment actually constructed). These features permit the cartridge to be employed in the horizontal attitude illustrated in the drawings, or in a vertical attitude, without any adverse effects on performance.

Lastly, the self-pumping air cleansing system reduces the accumulation of particle contaminants to a substantial degree while eliminating the need for any air pumping components. It should be noted that the direction of the air flow path, which is opposite to that employed with conventional forced air feed disk cartridge arrangements, provides the additional advantage that fresh, entering air is continuously flowed past the transducer heads, which reduces particle build-up in the most sensitive region of the disk to a minimum (as opposed to known devices which use the transducer access port as an air exit for the air and particles swept from the cartridge interior, thereby maximizing the probability of particle accumulation in the transducer region).

While the above provides a full and complete disclosure of the preferred embodiments of the invention, various modifications, alternate constructions and equivalents may be employed without departing from the true spirit and scope of the invention. For example, if desired an air filter and air flow return duct may be added to the disk drive housing 12 in the region adjacent the transducer end wall 14 to provide a closed air path system. In addition, spindle bias springs of different configuration than the U-shaped spring 75 may be employed, if desired. Moreover, equivalent simple lever locking arrangements may be employed for lock plate 46. Therefore, the above description and illustrations should not be construed as limiting the scope of the invention which is defined by the appended claims.

What is claimed is:

1. In a cartridge including a disk having a central hub, a housing for enclosing said disk, and a releasable disk locking means for maintaining said disk in a secured position when not in use, the improvement comprising relatively rigid lock means normally engaged with said disk hub, blade spring bias means coupled to said lock means for urging said disk hub into said secured position, means for restraining said lock means against lateral motion in said cartridge, and release means for enabling said lock means to be raised away from engagement with said disk hub to thereby release said disk for rotation within said cartridge housing, said lock means comprising a relatively rigid plate member having an inner margin portion normally in contact with said disk hub, and an outer margin normally in contact with said blade spring biasing means;

said release means comprising a relatively stiff pin means secured to said plate member adjacent said outer margin and slidably received in a confinement channel formed in said cartridge housing in a direction generally normal to said plate member, said pin means being snugly received along the axis of said confinement channel to minimize off-axis motion, said pin means and said plate member together forming a lever with a fulcrum at the intersection thereof.

2. The combination of claim 1 wherein said disk hub is annular and wherein said inner margin terminates in a circular segment.

3. The combination of claim 1 wherein said confinement channel comprises an aperture formed in said cartridge housing, and wherein said pin means is cylindrical.

4. The combination of claim 1 wherein said confinement channel comprises a slot formed in an inner wall surface of said cartridge housing, said slot having a bottom wall, and wherein said pin means comprises at least one lug extending from said plate member into said slot.

5. The combination of claim 4 wherein said release means further includes an additional release pin received in an aperture in said cartridge housing and engageable with said plate member in the region of said confinement channel to translate said lug in a direction away from said bottom wall when said additional release pin is advanced into said aperture.

6. The combination of claim 4 wherein said lateral motion restraining means comprises a spaced pair of abutment arms extending from opposed edge portions of said blade spring means to said outer margin of said lock means.

7. The combination of claim 1 wherein said lateral motion restraining means comprises a spaced pair of abutment members secured to said cartridge in the interior thereof adjacent opposed side edges of said lock means.

8. For use with a drive housing having a bottom wall, a spaced pair of side walls coupled to said bottom wall and a pair of stationary position registration members each extending along the inner edge of a different one of said side walls, each said registration member including an entry ramp portion, a stop/pivot portion spaced along the corresponding side wall from said entry ramp portion, and an intermediate guide portion;

a cartridge having a housing including a pair of opposed side wall members, each side wall member having registration means engageable with one of said stationary position registration members for enabling said cartridge to be positioned in a predetermined operating attitude, said registration means including an edge surface for contacting said entry ramp portion when said cartridge is initially inserted in said drive housing and for contacting said intermediate guide portion as said cartridge is advanced into the interior of said drive housing so that said cartridge housing is slidingly engaged thereby, and pivot engagement means located at a forward edge of said cartridge for pivoting engagement with said stop/pivot portion when said cartridge is located at a predetermined longitudinal position in said drive housing established by said stop/pivot position, said edge surface further including first and second guide engagement means for respectively engaging said intermediate guide portion and said ramp portion of said registration member when said cartridge is pivoted about said stop/pivot portion toward said registration member so that said cartridge is restrained against longitudinal movement when positioned in said operating attitude.

9. The combination of claim 8 wherein said drive housing further includes cartridge biasing means extending longitudinally of said drive housing for urging said cartridge edge surface into contact with said registration member as said cartridge is advanced therealong, said biasing means cooperating with said registration member to guide said pivot engagement means into contact with said stop/pivot portion.

10. The combination of claim 9 wherein said cartridge biasing means comprises an abutment member extending longitudinally of said side wall at a predetermined angle with respect to the top edge thereof.

11. The combination of claim 8 wherein said ramp portion and said intermediate guide portion comprise male members extending in a direction generally normal to the longitudinal axis of said drive housing side wall, and wherein said first and second guide engagement means comprise complementarily shaped recesses formed in said edge surface of said cartridge.

12. A self-centering hub for use with a mating spindle, said hub comprising a spindle referencing member having an aperture for receiving the free end of said spindle, said referencing member including first and second angularly spaced arcuate segments each defining a peripheral portion of said aperture and providing a lateral abutment for the outer surface of said spindle in the region adjacent said free end, the radius of curvature of each of said arcuate segments being closely matched to the radius of curvature of said spindle, said referencing member further including spindle biasing means laterally spaced from said arcuate segments and engageable with the outer surface of said spindle in the region adjacent said free end for urging said spindle into surface contact with said arcuate segments when said free end is received in said aperture.

13. The combination of claim 12 wherein said spindle biasing means includes a generally U-shaped spring, and means for pre-loading said spring to a predetermined spring force.

14. The combination of claim 13 wherein said pre-loading means includes a slot formed in a surface of said referencing member, said slot having preselected dimensions to maintain said spring in a compressed attitude, and means for retaining said spring in said slot.

15. The combination of claim 12 wherein said referencing member further includes a tapered central wall portion providing a generally conical entry ramp for said free end of said spindle, the inner end of said central wall portion terminating in said arcuate segments.

16. A disk memory cartridge having self-pumping air flow characteristics, said cartridge comprising:
a housing providing a generally enclosed volume, said housing including a bottom wall with a centrally located hub access aperture,
a disk rotatably received in said housing;
hub means coupled to said disk for enabling said disk to be rotated by an external spindle via said hub access aperture,
said housing having an end wall with a transducer access port located centrally therein, and an air exit port formed in said end wall at a position laterally displaced from said access port and providing a circumferentially oriented flow exit path for air entering said enclosed volume via said access port when said disk is rotated.

17. The combination of claim 16 wherein said air exit port is dimensioned to provide maximum exiting air flow.

18. A removable disc memory cartridge for use with a drive mechanism having a drive spindle, said drive mechanism being located in a drive housing having a bottom wall, a spaced pair of side walls coupled to said bottom wall and a pair of stationary position registration members each extending along the inner edge of a different one of said side walls, each registration member including an entry ramp portion, a stop/pivot portion spaced along the corresponding sidewall from said entry ramp portion, and an intermediate guide portion, said cartridge comprising:
a housing including a pair of opposed side wall members, each side wall member having registration means engageable with one of said stationary position registration members for enabling said cartridge to be positioned in a predetermined operating attitude, said registration means including an edge surface for contacting said entry ramp portion when said cartridge is initially inserted in said drive housing and for contacting said intermediate guide portion as said cartridge is advanced into the interior of said drive housing so that said cartridge housing is slidingly engaged thereby, and pivot engagement means located at a forward edge of said cartridge for pivoting engagement with said stop/pivot portion when said cartridge is located at a predetermined longitudinal position in said drive housing established by said stop/pivot portion, said edge surface further including first and second guide engagement means for respectively engaging said intermediate guide portion and said ramp portion of said registration member when said cartridge is pivoted about said stop/pivot portion toward said registration member so that said cartridge is restrained against longitudinal movement when positioned in said operating attitude;
a disc having a central hub positioned in said housing, said hub including a drive spindle referencing member having an aperture for receiving the free end of said spindle, said referencing member including first and second angularly spaced arcuate segments each defining a peripheral portion of said aperture and providing a lateral abutment for the outer surface of said spindle in the region adjacent said free end, the radius of curvature of each of said arcuate segments being closely matched to the radius of curvature of said spindle, said referencing member further including spindle biasing means laterally spaced from said arcuate segments and engageable with the outer surface of said spindle in the region adjacent said free end for urging said spindle into surface contact with said arcuate segments when said free end is received in said aperture;
releasable disc locking means for maintaining said disc in a secured position when not in use, said disc locking means including relatively rigid lock means normally engaged with said disc hub, spring bias means coupled to said lock means for urging said disc hub into said secured position, and release means for enabling said lock means to be raised away from engagement with said disc hub to thereby release said disc for rotation within said cartridge housing, said housing further including an end wall with a transducer access port located centrally therein, and an air exit port laterally displaced from said access port and providing a circumferentially orientated flow exit path for air entering said enclosed volume via said access port when said disc is rotated by said spindle.

19. The combination of claim 2 wherein said housing is provided with an anti-static surface.

* * * * *